United States Patent
Sugiura

(10) Patent No.: US 11,815,008 B1
(45) Date of Patent: Nov. 14, 2023

(54) IGNITION SYSTEM FOR INTERNAL COMBUSTION ENGINE

(71) Applicant: DENSO CORPORATION, Kariya (JP)

(72) Inventor: Akimitsu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/082,082

(22) Filed: Dec. 15, 2022

Related U.S. Application Data

(63) Continuation of application No. PCT/JP2021/020848, filed on Jun. 1, 2021.

(30) Foreign Application Priority Data

Jun. 22, 2020 (JP) .................................. 2020-106707

(51) Int. Cl.
F02B 19/12 (2006.01)
H01T 13/54 (2006.01)
H01T 13/20 (2006.01)

(52) U.S. Cl.
CPC .............. *F02B 19/12* (2013.01); *H01T 13/20* (2013.01); *H01T 13/54* (2013.01)

(58) Field of Classification Search
CPC ........... F02B 19/12; H01T 13/20; H01T 13/54
USPC ........................................................ 123/266
See application file for complete search history.

(56) References Cited

U.S. PATENT DOCUMENTS

| | | | | |
|---|---|---|---|---|
| 7,584,739 | B2 * | 9/2009 | Takahashi | F02B 23/101 |
| | | | | 123/266 |
| 8,074,620 | B2 * | 12/2011 | Filipek | F02P 15/06 |
| | | | | 123/285 |
| 2006/0201475 | A1 | 9/2006 | Shiraishi | |
| 2015/0240758 | A1 | 8/2015 | Fujimoto et al. | |
| 2021/0231076 | A1 | 7/2021 | Matsumoto et al. | |
| 2021/0363935 | A1 | 11/2021 | Matsumoto et al. | |

FOREIGN PATENT DOCUMENTS

| | | |
|---|---|---|
| DE | 10 2017 221 517 | 6/2019 |
| JP | 56-156411 | 12/1981 |
| JP | 2009-36157 | 2/2009 |
| JP | 2010-37950 | 2/2010 |
| JP | 2010037948 A  * | 2/2010 |
| JP | 2013-148098 | 8/2013 |
| JP | 2019-65832 | 4/2019 |
| JP | 2020-9747 | 1/2020 |

OTHER PUBLICATIONS

JP201037948A (Daisuke et al.) (Feb. 18, 2010) (Machine Translation) (Year: 2010).*
International Search Report dated Jul. 20, 2021 issued for International Application No. PCT/JP2021/020848 (2 pages).

* cited by examiner

*Primary Examiner* — Mahmoud Gimie

(74) *Attorney, Agent, or Firm* — Nixon & Vanderhye P.C.

(57) ABSTRACT

An ignition system for an internal combustion engine includes a spark plug including a prechamber in which a spark gap is located. A plug cover covers the prechamber and includes an ejection hole, which connects the prechamber to a main combustion chamber of the internal combustion engine. The ignition system for the internal combustion engine is configured to apply a pre-discharge voltage that causes a pre-discharge across the spark gap during an intake stroke of the internal combustion engine.

4 Claims, 5 Drawing Sheets

IGNITION SYSTEM FOR INTERNAL COMBUSTION ENGINE

CROSS-REFERENCE TO RELATED APPLICATION

This application is the U.S. bypass application of International Application No. PCT/JP2021/020848 filed on Jun. 1, 2021 which designated the U.S. and claims priority to Japanese Patent Application No. 2020-106707 filed on Jun. 22, 2020, the contents of both of which are incorporated herein by reference.

TECHNICAL FIELD

The present disclosure relates to an ignition system for an internal combustion engine.

BACKGROUND

DE 102017221517 A1 discloses a spark plug including a prechamber.

Such a spark plug causes ignition in the prechamber, thus generating a flame, which blows out through ejection holes as jets of flame into a main combustion chamber. This promotes combustion in the main combustion chamber.

SUMMARY

One aspect of the present disclosure is an ignition system for an internal combustion engine including a spark plug including a prechamber in which a spark gap is located. A plug cover covers the prechamber and includes an ejection hole, which connects the prechamber to a main combustion chamber of the internal combustion engine. The ignition system is configured to apply a pre-discharge voltage that causes a pre-discharge across the spark gap during an intake stroke of the internal combustion engine.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Unfortunately, in the spark plug including the prechamber, the heat of the flame formed in the prechamber is taken away by, for example, a housing and a plug cover.

For example, in an operating range of the internal combustion engine in which the temperature of the spark plug is relatively low such as in a cold condition or at part load, the flame in the prechamber may possibly be affected by cooling loss. In this case, boosting the jets of flame blowing out through the ejection holes is difficult, which may hinder improving the combustion efficiency in the main combustion chamber.

The present disclosure aims at providing an ignition system for an internal combustion engine that has improved combustion efficiency.

One aspect of the present disclosure is an ignition system for an internal combustion engine including a spark plug including a prechamber in which a spark gap is located. A plug cover covers the prechamber and includes an ejection hole, which connects the prechamber to a main combustion chamber of the internal combustion engine. The ignition system is configured to apply a pre-discharge voltage that causes a pre-discharge across the spark gap during an intake stroke of the internal combustion engine.

The ignition system for the internal combustion engine is configured to apply a pre-discharge voltage across the spark gap during the intake stroke. This prevents ignition before a main discharge and allows the gas in the prechamber to be activated. Thus, combustion is promoted in the prechamber during the subsequent main discharge. This boosts the jets of flame ejected through the ejection holes to the main combustion chamber, thus improving the combustion efficiency.

According to the above-described aspect, an ignition system for an internal combustion engine that has improved combustion efficiency is provided.

First Embodiment

An ignition system for an internal combustion engine according to an embodiment will be described with reference to FIGS. 1 to 3.

Figure 1:
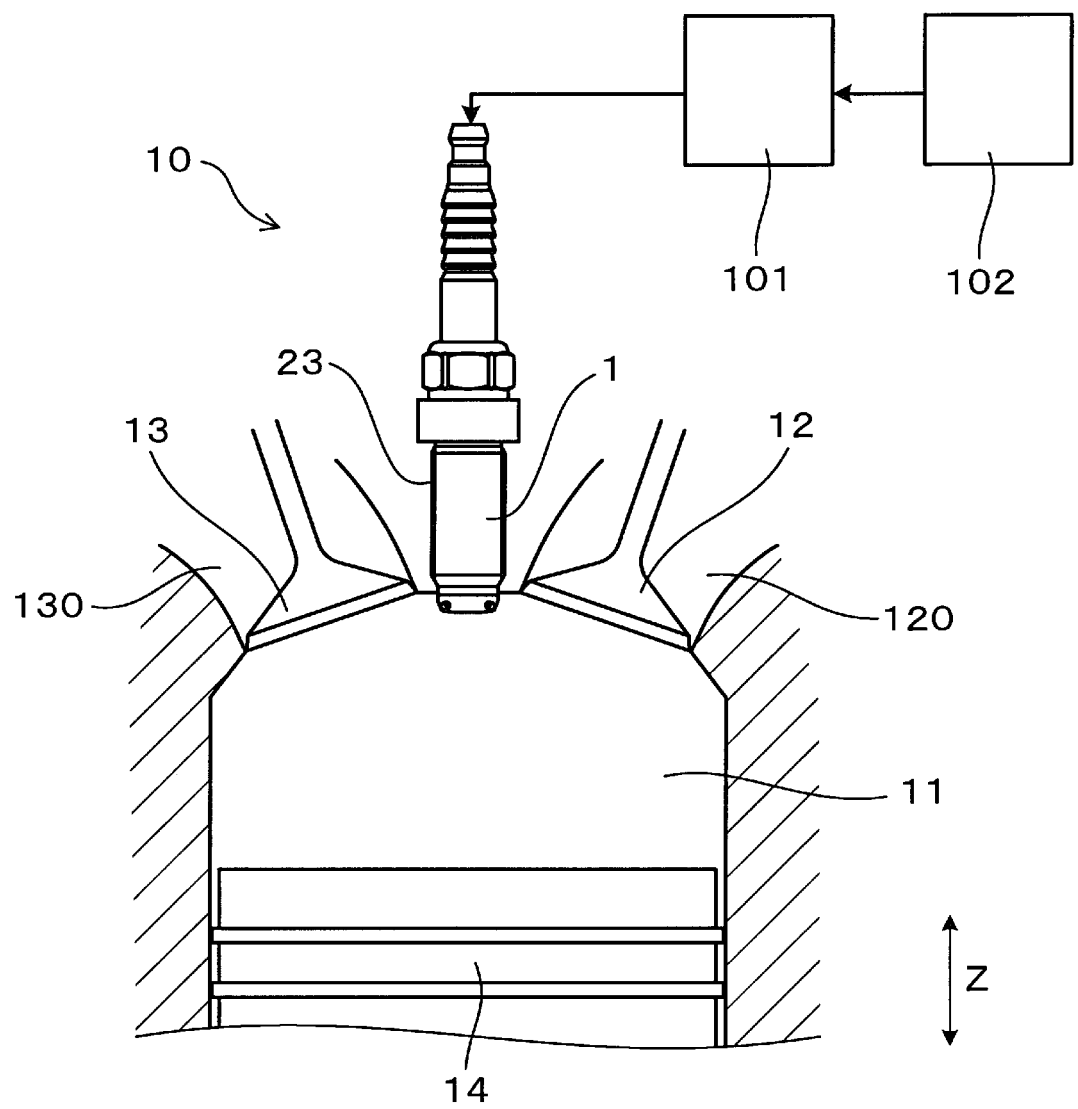
FIG. 1 is a diagram illustrating an ignition system for an internal combustion engine according to a first embodiment.
Figure 2:
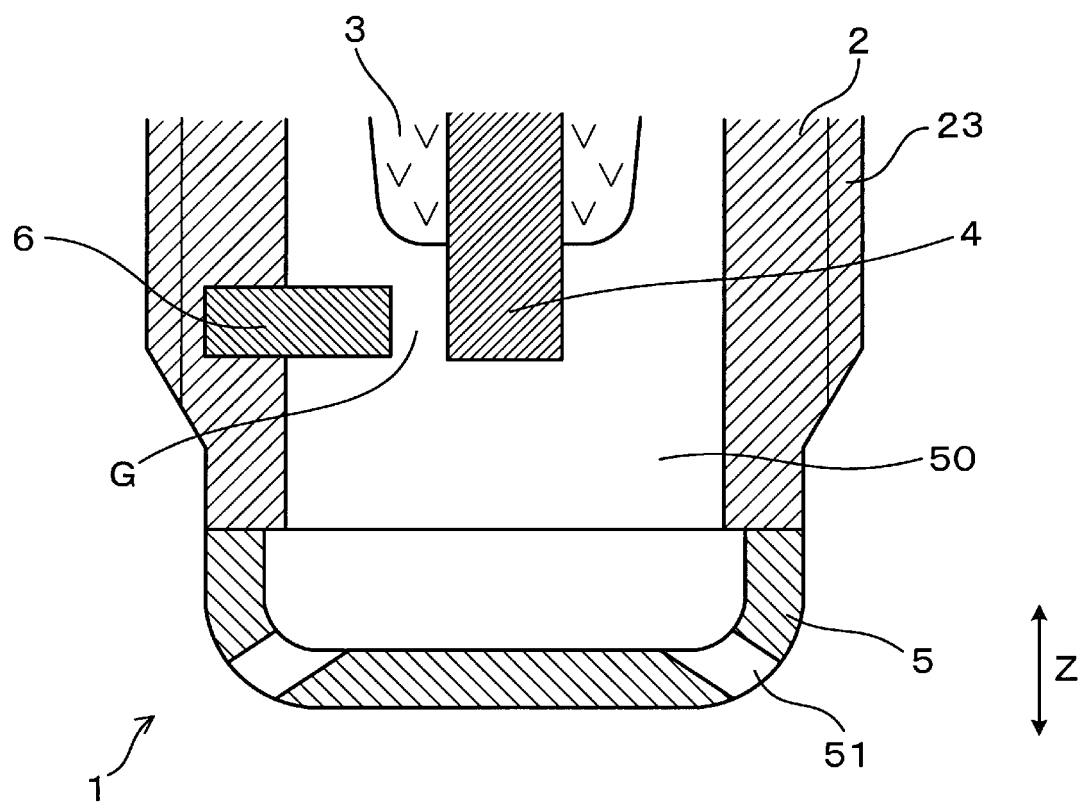
FIG. 2 is a cross-sectional view of a distal end section of a spark plug according to the first embodiment taken along the axial direction.

An ignition system 10 of the internal combustion engine according to the present embodiment is an ignition system for an internal combustion engine equipped with a spark plug 1 including a prechamber 50 as shown in FIGS. 1 and 2.

A spark gap G is located in the prechamber 50. The prechamber 50 is covered by a plug cover 5, which includes ejection holes 51. The ejection holes 51 connect the prechamber 50 to a main combustion chamber 11 of the internal combustion engine.

Figure 3:
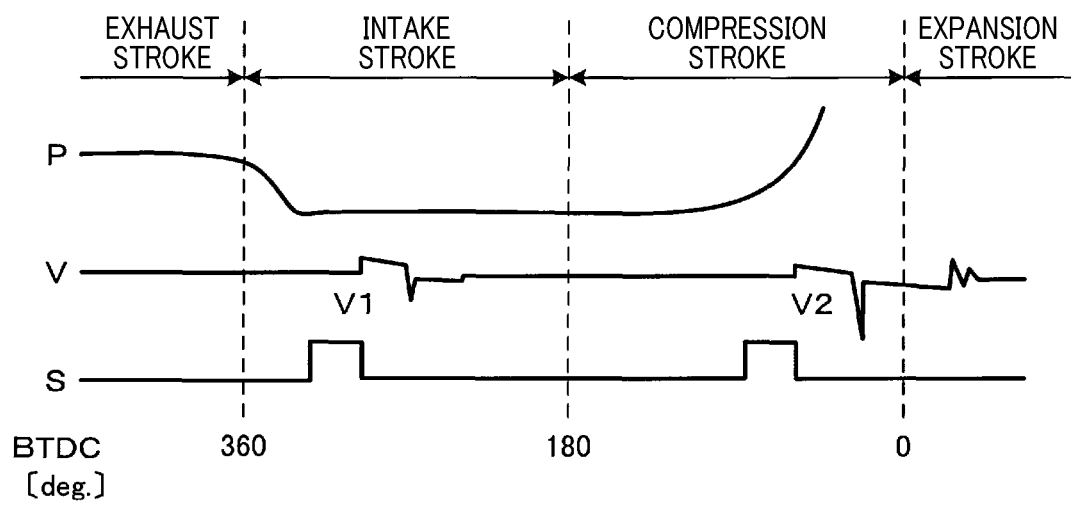
FIG. 3 is a timing diagram of an ignition signal and application of a voltage according to the first embodiment.

As shown in FIG. 3, the ignition system 10 is configured to apply a pre-discharge voltage V1 that generates a pre-discharge across the spark gap G during an intake stroke of the internal combustion engine.

The ignition system 10 includes, as shown in FIG. 1, the spark plug 1, an ignition coil 101, which is connected to the spark plug 1, and a control unit 102, which sends an ignition signal to the ignition coil 101. The control unit 102 may be constituted by, for example, an electronic control unit (ECU) for a vehicle.

The control unit 102 transmits the ignition signal to the ignition coil 101 at a predetermined point in time. In response to the ignition signal, the ignition coil 101 applies a high voltage to the spark plug 1. This generates a discharge in the spark gap G of the spark plug 1.

The ignition system 10 of the present embodiment may be used as ignition means for an internal combustion engine of, for example, automobiles and cogeneration. One end of the spark plug 1 in an axial direction Z is located in the main combustion chamber 11 of the internal combustion engine as shown in FIG. 1. The end of the spark plug 1 in the axial direction Z exposed to the main combustion chamber 11 will be referred to as a distal end, and the opposite end will be referred to as a proximal end.

The spark plug 1 includes a tubular insulator 3, a center electrode 4, a tubular housing 2, a ground electrode 6, and the plug cover 5 as shown in FIG. 2.

The center electrode 4 is held on the inner circumferential side of the insulator 3 and projects from the insulator 3 toward the distal end. The spark gap G is formed between the ground electrode 6 and the center electrode 4. The insulator 3 is held on the inner circumferential side of the housing 2. The housing 2 includes a mounting thread 23 for mounting the spark plug 1 to the internal combustion engine. The plug cover 5 is located at the distal end section of the housing 2. The plug cover 5 includes the ejection holes 51.

The ground electrode 6 is located to face the side surface of the distal end section of the center electrode 4 from the outer circumferential side. In the present embodiment, the ground electrode 6 is secured to the housing 2. The spark gap G is located proximally from the distal end of the housing 2.

The internal combustion engine refers to what is called a four-cycle engine, which performs reciprocation of a piston 14 and opening and closing of an intake valve 12 and an exhaust valve 13 shown in FIG. 1 so as to sequentially repeat an intake stroke, a compression stroke, an expansion stroke, and an exhaust stroke. FIG. 1 illustrates an intake port 120 and an exhaust port 130. The ignition system 10 causes the spark plug 1 to generate a main discharge and a pre-discharge at predetermined crank angles of the piston 14 as illustrated in FIG. 3. That is, the control unit 102 transmits the ignition signal at predetermined points in time with respect to the crank angle of the piston 14 to apply a voltage to the spark plug 1 through the ignition coil 101.

FIG. 3 is a timing diagram illustrating an example of the timing of the ignition signal and the application of a voltage with respect to the crank angle. In FIG. 3, a line S represents ON and OFF of the ignition signal, and a line V represents the change in the applied voltage. FIG. 3 also shows changes in the internal pressure of the main combustion chamber 11 with a curved line P. The values shown at the bottom of FIG. 3 represent the number of degrees of the crank angle before compression top dead center (BTDC).

As shown in FIG. 3, the ignition signal is transmitted near the compression top dead center and during the intake stroke, and a voltage is applied to the spark plug 1. The application of a voltage (refer to the reference numeral V2) near the compression top dead center is performed at points in time before or after the compression top dead center, that is, before or after BTDC 0°. FIG. 3 illustrates an example in which the points in time when the ignition signal is transmitted and a voltage is applied are during the compression stroke, but the points in time when the ignition signal is transmitted and a voltage is applied may be during the expansion stroke after the compression top dead center. The application of a voltage (refer to the reference numeral V1) during the intake stroke is performed at a point in time later than BTDC 360° and earlier than BTDC 180°. It is to be noted that the point in time when a voltage is applied to the spark plug 1 refers to a point in time when a voltage is started to be applied. In the present embodiment, the point in time when a voltage is applied to the spark plug 1 approximately coincides with the point in time when the ignition signal S is switched from ON to OFF.

The application of a voltage before or after the compression top dead center generates a main discharge in the spark gap G of the spark plug 1. The main discharge ignites an air-fuel mixture, so that jets of flame are ejected through the ejection holes 51, which causes combustion in the main combustion chamber 11.

The application of a voltage during the intake stroke generates a pre-discharge in the spark gap G of the spark plug 1. During the intake stroke, the air-fuel mixture is introduced into the main combustion chamber 11 through the intake port 120. The air-fuel mixture is then introduced into the prechamber 50 through the ejection holes 51. At this stage, the internal pressure in the main combustion chamber 11 and the prechamber 50 is substantially equal to the atmospheric pressure, and the fuel density of the air-fuel mixture in the main combustion chamber 11 and the prechamber 50 is relatively low. Additionally, the temperature of the main combustion chamber 11 and the prechamber 50 is lower compared with the point in time of the main discharge.

When a high voltage is applied across the spark gap G under such circumstances, although an atmospheric pressure glow discharge is formed in the spark gap G as the pre-discharge, ignition of the air-fuel mixture is inhibited. The pre-discharge activates the air and fuel around the spark gap G, thus generating active species such as ozone and hydroxy (OH) radicals. That is, high-energy electrons generated by the atmospheric pressure glow discharge collide with the molecules of the air and fuel. A collision dissociation reaction that occurs at this time generates the active species. Since the prechamber 50 including the vicinity of the spark gap G is covered by the plug cover 5, most of the generated active species stay around the spark gap G without spreading.

Subsequently, the air-fuel mixture is introduced into the prechamber 50 in which many active species exist by a compression stroke, and the fuel density and the temperature rise as the pressure rises. Causing the main discharge in the spark gap G in this state promotes ignition of the air-fuel mixture. That is, the formation of an initial flame and the flame growth in the prechamber 50 are promoted. This improves the ignitability in the prechamber 50 and boosts the jets of flame even when, for example, the temperature of the spark plug 1 is relatively low such as in a cold condition or at part load of the internal combustion engine.

Next, the operational advantages of the present embodiment will be described.

The ignition system 10 of the internal combustion engine is configured to apply a pre-discharge voltage across the spark gap G during the intake stroke. This allows the gas in the prechamber 50 to be activated while preventing ignition before the main discharge. Thus, the combustion is promoted in the prechamber 50 during the main discharge as described above. This boosts the jets of flame ejected through the ejection holes 51 to the main combustion chamber 11, thus improving the combustion efficiency.

It is to be noted that, during the exhaust stroke before the intake stroke, that is, the period earlier than BTDC 360°, a high-temperature residual gas ($CO_2$, $H_2O$, etc.) fills the prechamber 50, and almost no air-fuel mixture is probably present. Additionally, since $CO_2$, $H_2O$, etc. contained in the residual gas are apt to adsorb electrons, the generation of the active species by the above-described collision dissociation reaction is hindered. Furthermore, it is also known that the active species, such as ozone, are likely to be eliminated at high temperature. Thus, even if the pre-discharge voltage is applied during the exhaust stroke, the combustion efficiency during the main discharge is probably unlikely to be improved.

During the compression stroke after the intake stroke, that is, the period after BTDC 180°, the air-fuel mixture starts to fill the prechamber 50. Thus, if the pre-discharge voltage is applied in this period, the combustion reaction such as a low-temperature oxidation reaction starts. The early ignition probably undesirably eliminates the active species in the prechamber 50. This probably results in hindering the improvement of the combustion efficiency during the main discharge.

From the above perspective also, it is effective to apply a pre-discharge voltage during the intake stroke, which is after the residual gas in the prechamber 50 is scavenged and before early ignition tends to occur.

The spark gap G is located proximally from the distal end of the housing 2. Thus, the spark gap G is located at a position away from the ejection holes 51. This allows the initial flame to be easily formed at a position away from the ejection holes 51. In this case, the jets of flame are likely to be ejected after the flame has sufficiently grown, and the internal pressure of the prechamber 50 has sufficiently increased. On the other hand, when the spark gap G is located proximally from the distal end of the housing 2, cooling loss is likely to occur. To address this issue, setting the point in time when the pre-discharge voltage is applied as described above improves the ignitability in the prechamber 50. Thus, the combustion efficiency of the internal combustion engine is even more efficiently improved.

As described above, the present embodiment provides the ignition system for the internal combustion engine that has improved combustion efficiency.

Experimental Example 1

Figure 4:
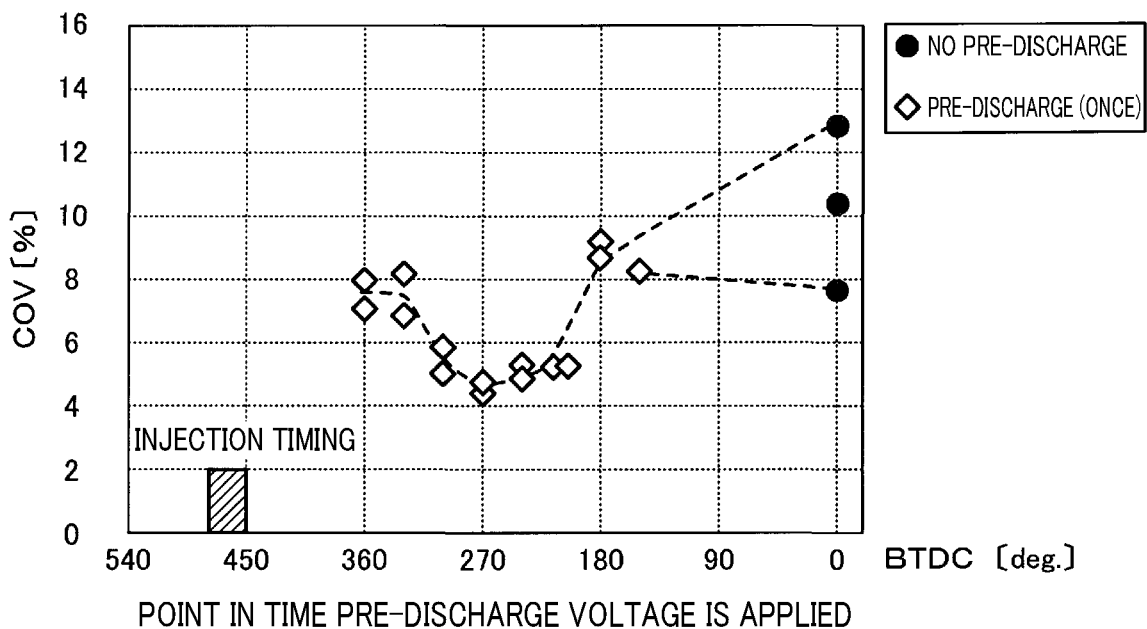
FIG. 4 is a diagram illustrating the relationship between a point in time when a pre-discharge voltage is applied and a coefficient of variance (COV) according to Experimental Example 1.
Figure 5:
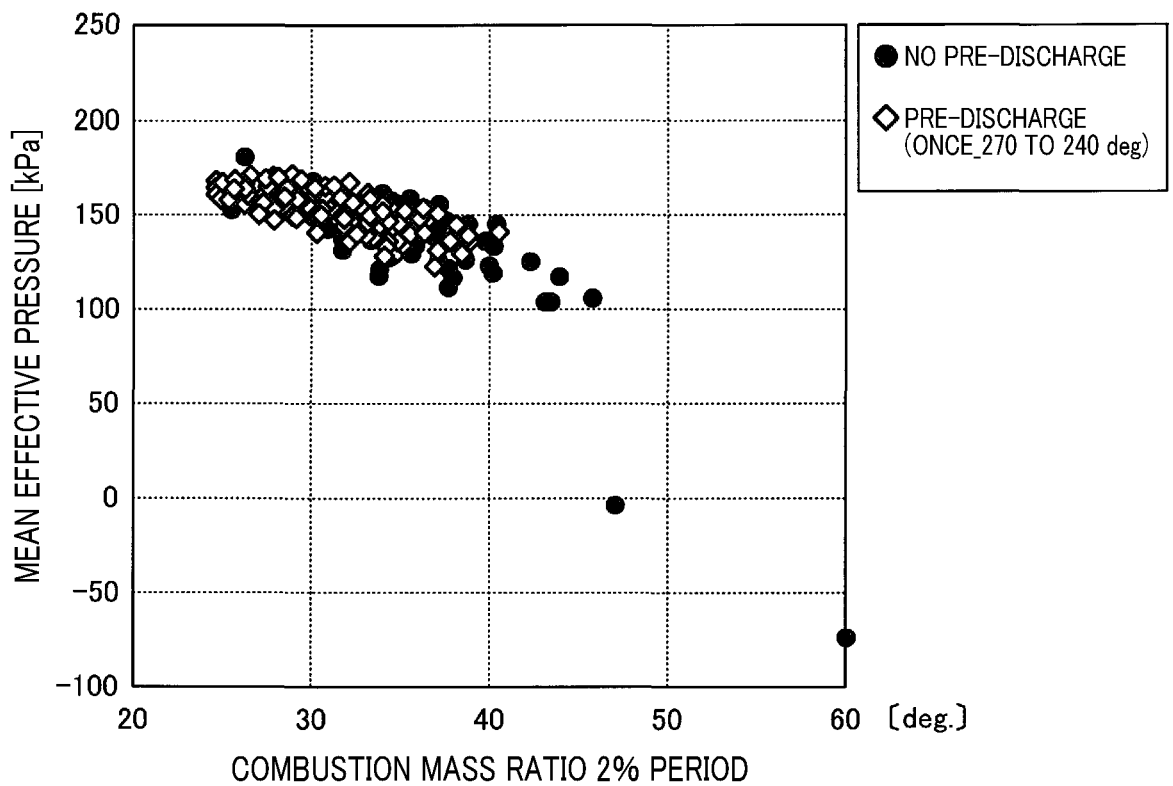
FIG. 5 is a diagram illustrating test results obtained by comparing an initial combustion speed and a mean effective pressure depending on whether a pre-discharge is performed according to Experimental Example 1.

The present example is an example of verifying the improvement in the combustion of the internal combustion engine by performing the pre-discharge during the intake stroke as shown in FIGS. 4 and 5.

First, as shown in FIG. 4, the relationship between the point in time when the pre-discharge voltage is applied and the combustion fluctuation rate (hereinafter, also referred to as the coefficient of variance (COV)) was investigated. The internal combustion engine used in the experiment was a port-fuel-injected four-cycle gasoline engine with a rotational speed of 1200 rpm and the point in time of the main discharge at BTDC 30°. Furthermore, the ignition energy supplied from the ignition coil 101 to the spark plug 1 for the pre-discharge was equivalent to that for the main discharge. Assuming cold conditions, the coolant temperature of the internal combustion engine was set to 40° C.

For comparison, the COV was measured also for the case in which the pre-discharge was not performed.

The results are shown in FIG. 4. In FIG. 4, the results of the COV when the pre-discharge was not performed are plotted at BTDC 0° for convenience. An interpolated curve that approximately connects the plots is indicated by a dashed line.

As apparent from FIG. 4, when the pre-discharge was not performed, the COV varied. In contrast, when the pre-discharge voltage was applied during the intake stroke of the internal combustion engine, that is, between BTDC 360° to 180°, the COV was kept below a certain level. Applying the pre-discharge voltage at a point in time earlier than BTDC 180° seems to more reliably reduce the COV. Moreover, setting the point in time when the pre-discharge voltage is applied at or earlier than BTDC 200° further reduces the COV. This is probably because in the case in which the point in time when the pre-discharge voltage is applied is later than 200°, part of the pre-discharge occurs during the compression stroke, and the above-described early ignition may partially affect the COV. Thus, the point in time when the pre-discharge voltage is applied is probably more preferably set at or earlier than 200°.

Furthermore, applying the pre-discharge voltage at a point in time later than BTDC 330°, or moreover, at or later than a point in time of BTDC 300° further reduces the COV.

FIG. 5 illustrates the test results obtained by comparing an initial combustion speed and a mean effective pressure depending on whether the pre-discharge is performed. In this test, the point in time when the pre-discharge voltage is applied was set between BTDC 270° to 240°. To evaluate the initial combustion speed, the horizontal axis of FIG. 5 shows the point in time when a combustion mass ratio of 2% is reached from the starting of ignition represented by the crank angle after the compression top dead center. The mean effective pressure is shown on the vertical axis of FIG. 5. The higher the mean effective pressure and the earlier the point in time when the combustion mass ratio reaches 2%, the safer combustion is achieved.

As shown in FIG. 5, when the pre-discharge was not performed, the initial combustion speed and the mean effective pressure varied, and there were cycles in which the initial combustion speed was slow, and the mean effective pressure was low. In contrast, when the pre-discharge was performed, the initial combustion speed was fast, and the mean effective pressure remained at a high level. In other words, stable combustion was achieved. The results show that the combustion efficiency during the main discharge is improved by the application of the pre-discharge voltage during the intake stroke.

Second Embodiment

Figure 6:
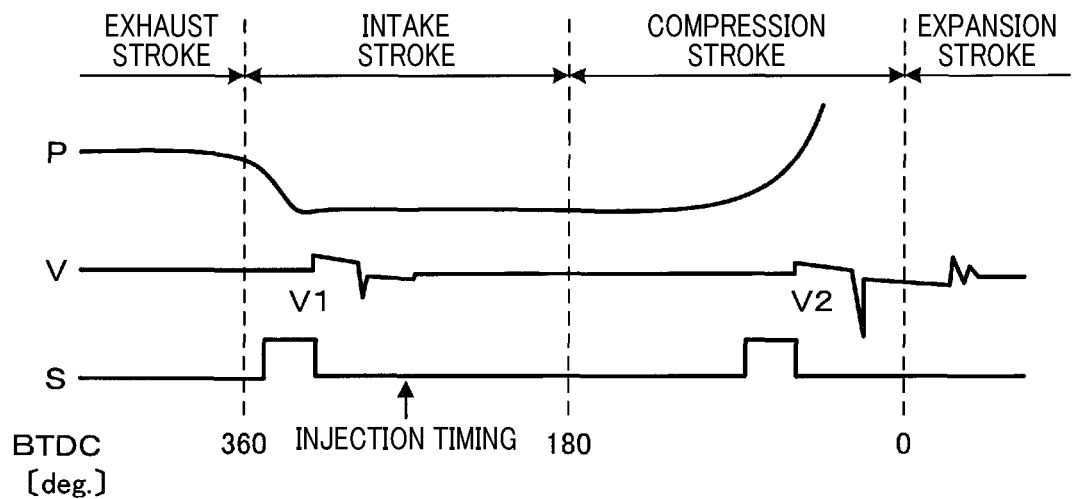
FIG. 6 is a timing diagram of an ignition signal and application of a voltage according to a second embodiment.

As shown in FIG. 6, the present embodiment is an example of the ignition system 10 applied to what is called a direct-injection internal combustion engine.

That is, in the present embodiment, the internal combustion engine is configured to directly inject fuel into the main combustion chamber 11. The ignition system 10 is configured to apply the pre-discharge voltage V1 across the spark gap G at a point in time before the injection of fuel.

In the direct-injection engine, the fuel is injected from an injector (not shown) at a predetermined point in time during the intake stroke. The pre-discharge voltage V1 is applied across the spark plug 1 at the stage before the injection timing of the fuel.

Others are the same as the first embodiment. The reference numerals used in and after the second embodiment that are the same as the reference numerals of the above embodiment represent, unless otherwise specified in particular, the same components as those in the above embodiment.

In the case of the direct-ignition engine, the air that does not contain the fuel is introduced into the main combustion chamber 11 through the intake port 120. Thus, in the period before the fuel injection during the intake stroke, the air that does not contain the fuel is introduced into the main combustion chamber 11 and the prechamber 50. In this period, the air in the prechamber 50 is activated by applying the pre-discharge voltage.

It is to be noted that, in the period after the fuel injection during the intake stroke, a rich air-fuel mixture is probably introduced into the prechamber 50. Thus, in the case of the direct-injection engine, when the pre-discharge voltage is applied after the fuel injection, a combustion reaction easily occurs, which may possibly eliminate the active species. From such a perspective, the ignition system 10 for the direct-injection internal combustion engine preferably applies the pre-discharge voltage V1 before the fuel injection.

Additionally, the same operational advantages as the first embodiment are achieved.

Experimental Example 2

Figure 7:
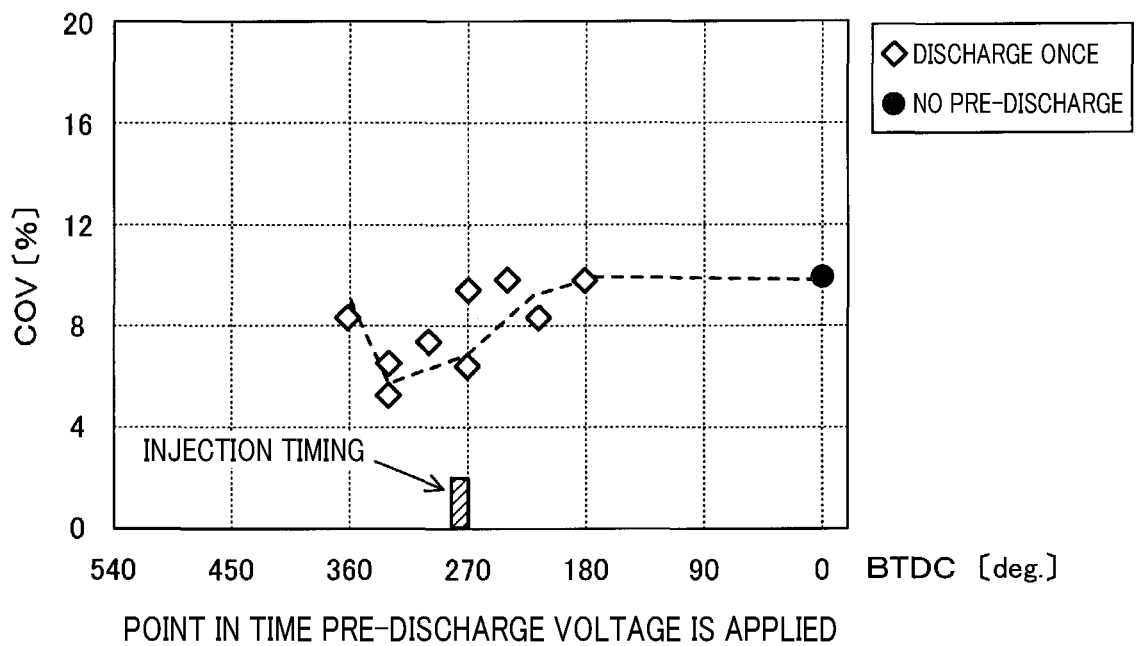
FIG. 7 is a diagram illustrating the relationship between a point in time when a pre-discharge voltage is applied and a COV according to Experimental Example 2.

The present example is an example of verifying the improvement in the combustion of the direct-injection internal combustion engine by performing the pre-discharge during the intake stroke as shown in FIG. 7.

In the present example also, like Experimental Example 1, the relationship between the point in time when the pre-discharge voltage is applied and the COV was investigated. The internal combustion engine used in the experiment was a direct-injection four-cycle gasoline engine with a rotational speed of 1200 rpm and the point in time of the main discharge at BTDC 30°. Additionally, the start of injection (SOI) of fuel was set to BTDC 280°. Furthermore, the electric energy supplied from the ignition coil 101 to the spark plug 1 for the pre-discharge was equivalent to that for the main discharge.

For comparison, the COV was measured also for the case in which the pre-discharge was not performed.

The results are shown in FIG. 7. In FIG. 7, the result of the COV when the pre-discharge was not performed is plotted at BTDC 0° for convenience. An interpolated curve that approximately connects the plots is indicated by a dashed line.

As apparent from FIG. 7, applying the pre-discharge voltage at a point in time before fuel injection timing reduces the COV. The results show that applying the pre-discharge voltage is effective particularly before the fuel injection timing during the intake stroke in the direct-injection internal combustion engine.

Third Embodiment

Figure 8:
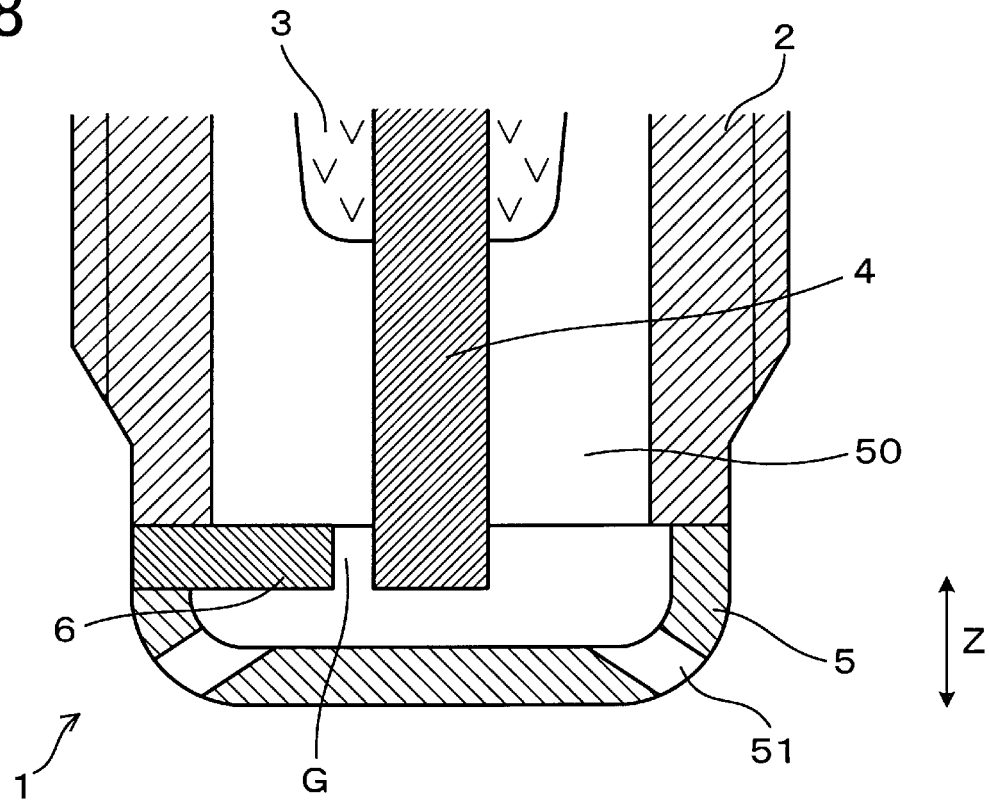
FIG. 8 is a cross-sectional view of a distal end section of a spark plug according to a third embodiment taken along the axial direction.

The present embodiment is an embodiment of the ignition system 10 that uses the spark plug 1 in which the spark gap G is located distally from the distal end of the housing 2 as shown in FIG. 8.

In the present embodiment, the ground electrode 6 projects from the joint section between the distal end of the housing 2 and the proximal end of the plug cover 5 toward the center electrode 4 in the radial direction of the plug.

Others are the same as the first embodiment.

In the present embodiment, the spark gap G is located at a position relatively close to the distal end, that is, the ejection holes 51 in the prechamber 50. Thus, the cooling loss of the initial flame formed by the main discharge is relatively reduced. Also, since the air-fuel mixture is introduced in the vicinity of the spark gap G at a relatively early stage of the intake stroke, setting the point in time when the pre-discharge voltage is applied at the initial stage of the intake stroke is likely to be effective.

Additionally, the same operational advantages as the first embodiment are achieved.

Fourth Embodiment

Figure 9:
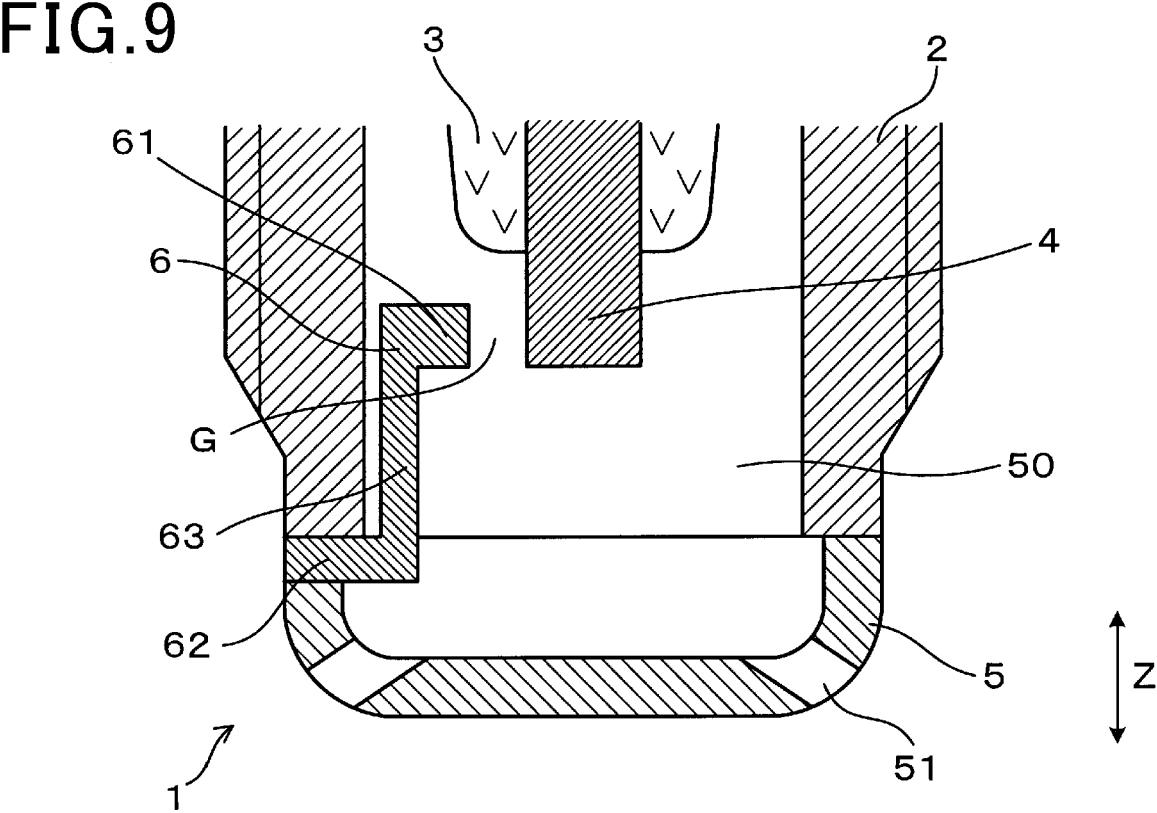
FIG. 9 is a cross-sectional view of a distal end section of a spark plug according to a fourth embodiment taken along the axial direction.

The present embodiment is an embodiment in which the ground electrode 6 is crank shaped as shown in FIG. 9.

The ground electrode 6 includes a joint end portion 62 and a discharge end portion 61, which is located proximally from the joint end portion 62. The ground electrode 6 includes a connecting portion 63, which connects the joint end portion 62 and the discharge end portion 61 in the axial direction Z.

The joint end portion 62 is joined to the distal end face of the housing 2 or the proximal end section of the plug cover 5. The connecting portion 63 is located along an inner circumferential surface 22 of the housing 2. The discharge end portion 61 is located to face the side surface of the distal end section of the center electrode 4. Thus, the spark gap G is formed between the discharge end portion 61 and the center electrode 4. The spark gap G is formed at a position proximal from the distal end of the housing 2.

Others are the same as the first embodiment.

With the ignition system 10 including the spark plug 1 configured as described above, the combustion efficiency of the internal combustion engine is improved by applying the pre-discharge voltage at a point in time during the intake stroke.

In the case of the present embodiment, like in the first embodiment, the spark gap G is located at a position away from the ejection holes 51. Thus, while the jets of flame are easily boosted, the cooling loss is likely to occur. However, as described above, since the ignitability during the main discharge is improved by applying the pre-discharge voltage at a point in time during the intake stroke, the combustion efficiency is effectively improved.

Additionally, the same operational advantages as the first embodiment are achieved.

The present disclosure is not limited to the illustrated embodiments, but may be applied to various embodiments without departing from the scope of the disclosure.

Although the present disclosure has been described in accordance with the embodiments, it is understood that the present disclosure is not limited to the embodiments and the configurations. The present disclosure embraces various modifications and deformations that come within the range of equivalency. Additionally, various combinations and forms, or other combinations and forms including only one or more additional elements, or less than all elements are included in the scope and ideas obtainable from the present disclosure.

What is claimed is:

1. An ignition system for an internal combustion engine comprising:
   a spark plug including a prechamber in which a spark gap is located; and
   a plug cover covering the prechamber and including an ejection hole, which connects the prechamber to a main combustion chamber of the internal combustion engine, wherein
   the ignition system is configured to apply a pre-discharge voltage that causes a pre-discharge across the spark gap during an intake stroke of the internal combustion engine; and
   the internal combustion engine is configured to directly inject fuel into the main combustion chamber and to apply a pre-discharge voltage across the spark gap at a point in time before injecting the fuel.

2. The ignition system for the internal combustion engine according to claim 1, wherein
the ignition system is configured to apply the pre-discharge voltage at or earlier than a crank angle of 200° relative to a compression top dead center of the internal combustion engine.

3. The ignition system for the internal combustion engine according to claim 2, wherein
the spark plug includes a housing including a mounting thread for mounting the spark plug to the internal combustion engine, and the spark gap is located proximally from a distal end of the housing.

4. The ignition system for the internal combustion engine according to claim 1, wherein
the spark plug includes a housing including a mounting thread for mounting the spark plug to the internal combustion engine, and the spark gap is located proximally from a distal end of the housing.

\* \* \* \* \*